United States Patent [19]

Jeng

[11] Patent Number: 5,386,230
[45] Date of Patent: Jan. 31, 1995

[54] CHARGED-COUPLED DEVICE CAMERA WITH VOLTAGE ADJUSTMENT CONTROL

[75] Inventor: Peide Jeng, Tucson, Ariz.
[73] Assignee: Photometrics, Ltd., Tucson, Ariz.
[21] Appl. No.: 26,677
[22] Filed: Mar. 5, 1993
[51] Int. Cl.⁶ ............................................. H04N 5/225
[52] U.S. Cl. ................................... 348/241; 348/255
[58] Field of Search ............... 358/209, 174, 166, 177, 358/178; H04N 5/52; 341/118; 348/241, 207, 222, 255

[56] References Cited

U.S. PATENT DOCUMENTS

| 4,525,741 | 6/1985 | Chahal et al. ................... | 358/209 |
| 5,121,117 | 6/1992 | Rabii ............................... | 358/174 X |
| 5,121,119 | 6/1992 | Miguchi et al. ................. | 341/118 X |

Primary Examiner—Joseph Mancuso
Assistant Examiner—Wendy R. Greening
Attorney, Agent, or Firm—Herbert M. Shapiro

[57] ABSTRACT

A modular CCD includes a camera head and a camera body. The camera body includes an amplifier, an A/D converter, a D/A converter, a video simulator, a summation circuit and a switch. The switch is used to controllably switch between the output of the camera head and the video simulator output. A system is provided for adjusting the voltage supplied to the switch by the D/A converter to adjust the voltage output of the summation circuit to compensate for the difference between those outputs so that the camera body can accept different camera heads with different gain requirements.

3 Claims, 2 Drawing Sheets

CHARGED-COUPLED DEVICE CAMERA WITH VOLTAGE ADJUSTMENT CONTROL

FIELD OF THE INVENTION

This invention relates to Charged-Coupled (CCD) cameras and more particularly to such cameras subject to temperature variations during use.

BACKGROUND OF THE INVENTION

CCD cameras have been in commercial use for well over a decade. Such a camera employs a CCD array which typically is housed in a cooled chamber in which a vacuum is maintained and which is hermetically sealed from the exterior environment.

Electrical connection to the CCD for providing control and drive pulse trains for capturing incident light images and for retrieving coded representations of those images are made through conductors which penetrate the hermetic seal.

The electronic drive and control circuitry is located external to the cooled chamber. Included within that circuitry are an output amplifier and an analog to digital converter for converting CCD output voltages from the amplifier to digital signals for transmission to a computer. Frequently during operation, the electronic circuitry experiences change in ambient temperature which causes drift in the signal voltages exiting the CCD, Such variations cause the system to produce erratic, often incorrect, data resulting in a degraded image at best.

BRIEF DESCRIPTION OF AN ILLUSTRATIVE EMBODIMENT OF THIS INVENTION

In accordance with the principles of this invention, the electronic circuitry for a CCD camera includes a video signal simulator and a switch for switching controllably between the simulator output and the CCD output. The circuit also includes a digital to analog (D/A) converter, which is software controlled, and a summation circuit between the CCD output amplifier and the A/D converter. The summation circuit has two inputs, one for connection to the CCD output amplifier and one for connection to the output from the D/A converter.

In operation, the switch periodically switches to the video simulator which provides reference video signals against which the CCD output signals are compared. If they are of different amplitudes, the application software in the computer activates the D/A converter to change the output of the A/D converter to compensate for the difference. Thus, the CCD camera provides a high degree of confidence in the data it produces. The inclusion of the switch and the video simulator, in addition, provides a ready means for testing the circuit during diagnostic routines.

DETAILED DESCRIPTION OF AN ILLUSTRATIVE EMBODIMENT OF THIS INVENTION

Figure 1:
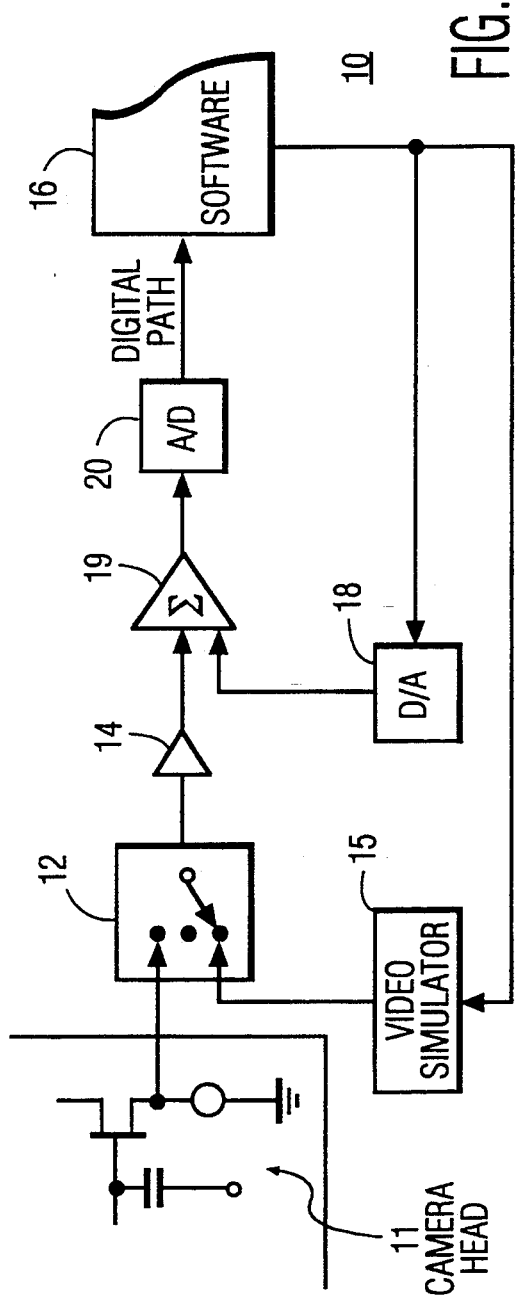
FIG. 1 is a block diagram of an illustrative embodiment in accordance with the principles of this invention.

FIG. 1 shows a system 10 for testing video signals originating at CCD camera head 11 and for changing the gain of those signals adapting the camera head to different camera bodies which require different gain values. The system employs a switch 12 and the output of camera head 11 is applied to an input of an amplifier 14 via the switch. The term "camera head" refers to a detachable unit of a solid state modular camera comprising a solid state imager such as a CCD array with associated electronics. The camera head can be mated with a universal electronic unit which constitutes the camera body and the camera body is configured to accept different camera heads. The term is first disclosed in copending application Ser. No. 08/027,297, filed Mar. 4, 1993 for Derek P. Guenther and assigned to the assignee of the present application.

The system also includes a video simulator 15, the output of which also is connected to the input of amplifier 14 via the switch. Simulator 15 is under the control of application software at 16 for determining periodically whether reference video signals are applied to amplifier 14 or, instead, signals from head 11.

The application software also controls digital to analog (D/A) converter 18 as indicated. The output of converter 18 is applied to an output of a summation circuit 19, The output of amplifier 14 also in connected to summation circuit 19 via a second input. The output of summation circuit 19 is connected to the input of an A/D converter 20. The applications software is responsive to the digital output of A/D converter 20 to compare that output with a previous output responsive to an input from video simulator 15.

Video simulator 15 includes an A/D converter and logic circuitry and is available commercially to produce a digital coded signal representative of a selected voltage value. When switch 12 is adjusted to simulator 15, the application software stores the coded signal resulting from converter 20. This operation is carried out periodically (every five to ten minutes) and, in each instance, provides a digital coded reference signal for incoming video signals from the camera head.

If the application software detects a difference in mean voltage between the incoming video signal and the previous reference signal from simulator 15, the software applies a digital signal to D/A converter 18. Converter 18 responds to apply a voltage value to an input to summation circuit 19 to change the voltage applied to A/D converter 20 so that the digital output code from converter 20 is the desired value. Consequently, any drift in voltage of an incoming video signal from head 11 is corrected.

Figure 2:
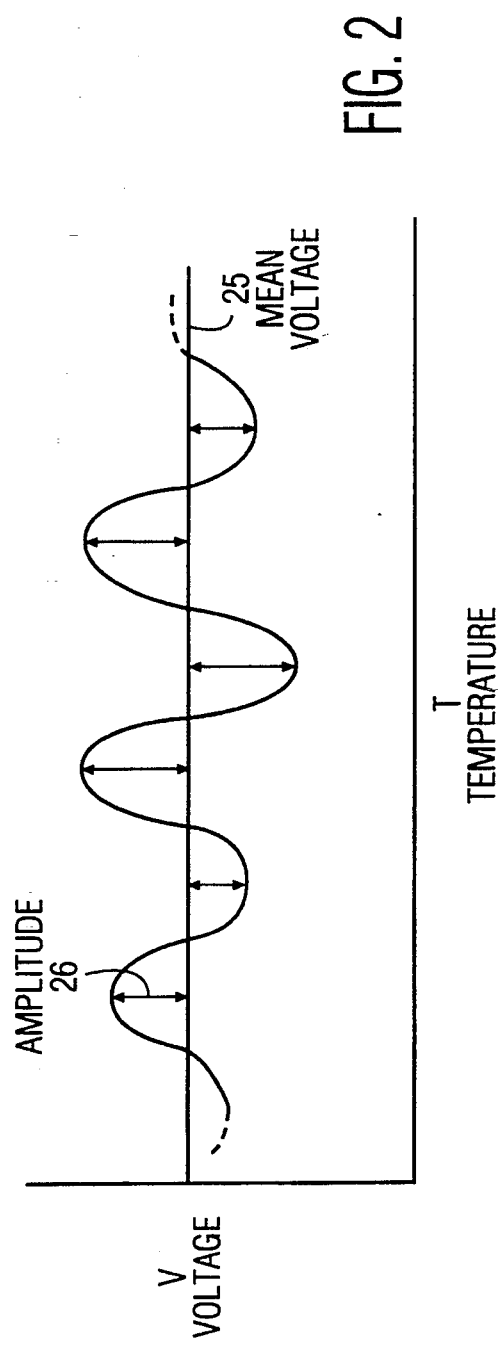
FIG. 2 is a waveform illustrating a typical video voltage drift representation from a CCD image and the mean voltage adjusted by the system of FIG. 1.

FIG. 2 shows a graph of voltage verses time for a representative video signal from head 11. Horizontal line 25 represents the mean voltage value for the signal. The amplitude of the video signal, indicated at 26 is adjusted by the system of FIG. 1 to compensate for drift due to temperature excursions.

The system also is useful to measure gain, for example, during diagnostic routines or when it is desired to replace a camera head with another head. It is important in such instances to be able to determine whether changes in gain are due to the camera head or due to the system of FIG. 1. The system is operative to test if it is the culprit in causing changes in gain and thus can determine if a camera head is defective. Also, the system is capable of adjusting the gain to any specified value, thus permitting a camera head to be used with different camera bodies which might require different gain values.

Figure 3:
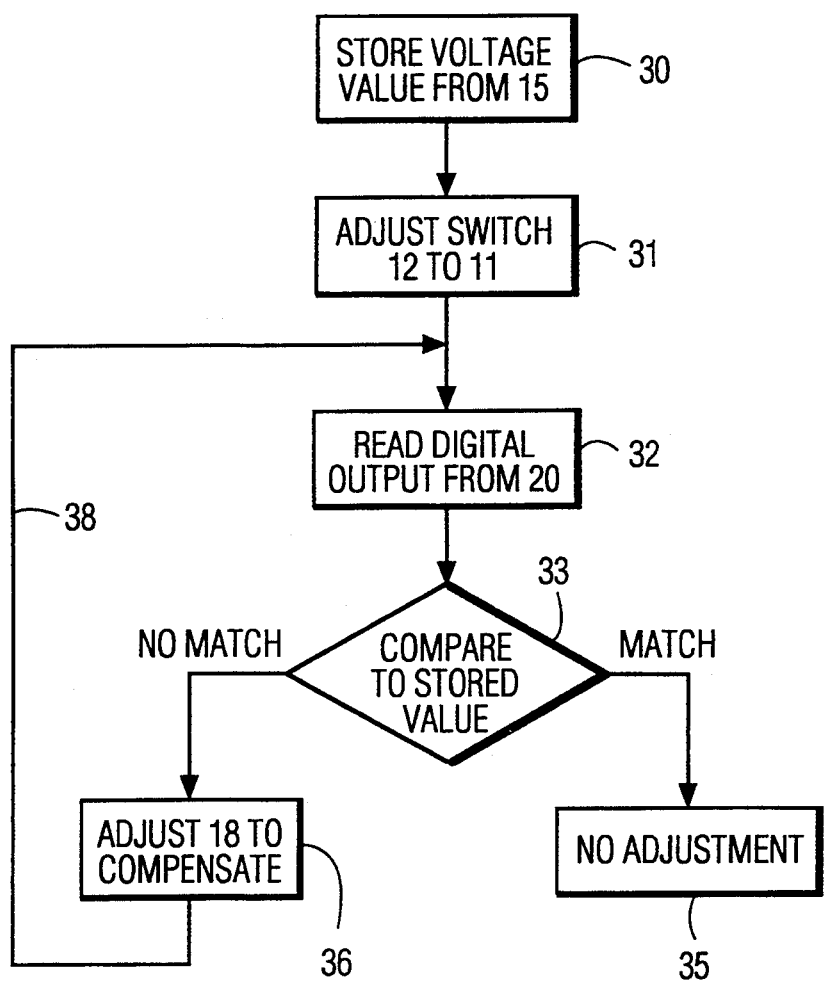
FIG. 3 is a flow diagram of the software for controlling the system of FIG. 1.

The operation of the applications software to adjust the voltage to a desired value (or to test for the gain of the system) is described in connection with the flow diagram of FIG. 3. Specifically, the software operates to store a (prior determined) reference voltage value from video simulator 15 as indicated by block 30. During a periodic test procedure, the software operates to adjust switch 12 for an input from 11 as indicated by block 31. The software then reads (and stores) the digital output from 20 as indicated by block 32.

Subsequently the software determines whether or not the output from 20 (during the receipt of video signals from head 11) matches or differs from the stored reference signal as indicated by block 33. If a match occurs, no adjustment of D/A converter 18 is necessary as is indicated by block 35. If no match occurs, the software adjusts D/A converter to adjust the output of summation circuit 19 to compensate. This is indicated by block 36. The operation repeats as indicated by line 38.

The gain of the system of FIG. 1 is determined by subtracting the voltage value at from the output of converter 20.

What is claimed is:

1. A modular electronic camera, said camera including a camera head and a camera body, said head including a CCD array having a first output for providing a first voltage signal, said body including a video simulator for providing a reference voltage signal and having a second output, said body also including a switch having first and second inputs connected to said first and second outputs and also having a third output, said switch also including means for controllably connecting said first or said second input to said third output, said body also including an amplifier and a summation circuit, said summation circuit having first and second inputs and an output, said amplifier having an input connected to said third output and having an output connected to said first input of said summation circuit, said body also including means connected to said second input of said summation circuit for adjusting the amplitude of the voltage at said output of said summation circuit to compensate for the difference between said first voltage signal and said reference signal.

2. A modular camera as in claim 1 wherein said means for adjusting includes a D/A converter, said D/A converter having an output connected to said second input of said summation circuit, said means also including an A/D converter having an input connected to the output of said summation circuit, said A/D converter having an output connected to a processor, said D/A converter including an input also connected to said processor, said processor including means for storing said first and said reference voltage signals and for applying via said D/A converter a voltage for changing the voltage at said output of said summation circuit to compensate for any difference between said first voltage signal and said reference signal.

3. A camera body, said body including a switch having first and second inputs and an output, said body also including an amplifier having an input connected to the output of said switch, said body also including a summation circuit, an A/D converter, a processor, a D/A converter and a video simulator, said summation circuit having first and second inputs connected to outputs of said amplifier and said video simulator, the output of said summation circuit being connected to the input of said A/D converter, the output of said A/D converter being connected to said processor, the input to said D/A converter being connected to said processor, said switch including means for connecting said first or said second input thereto to said output thereof, said processor including means for storing said reference voltage signal and for applying to said summation circuit via said D/A converter a voltage for changing the voltage at said output of said summation circuit to compensate for any difference between said reference voltage signal and a voltage signal applied to said first input of said switch.

* * * * *